(12) United States Patent
Shelby et al.

(10) Patent No.: US 10,738,742 B2
(45) Date of Patent: Aug. 11, 2020

(54) METHOD AND SYSTEM FOR ENGINE WATER INJECTION

(71) Applicant: Ford Global Technologies, LLC, Dearborn, MI (US)

(72) Inventors: Michael Howard Shelby, Plymouth, MI (US); Gopichandra Surnilla, West Bloomfield, MI (US); Mohannad Hakeem, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 57 days.

(21) Appl. No.: 16/214,931

(22) Filed: Dec. 10, 2018

(65) Prior Publication Data

US 2019/0113005 A1 Apr. 18, 2019

Related U.S. Application Data

(62) Division of application No. 15/384,243, filed on Dec. 19, 2016, now Pat. No. 10,167,819.

(51) Int. Cl.
| | |
|---|---|
| *F02B 47/02* | (2006.01) |
| *F02M 25/022* | (2006.01) |
| *F02M 25/028* | (2006.01) |
| *F02M 25/03* | (2006.01) |
| *F02D 41/00* | (2006.01) |
| *F02D 41/14* | (2006.01) |

(Continued)

(52) U.S. Cl.
CPC ....... *F02M 25/0227* (2013.01); *F02D 35/027* (2013.01); *F02D 41/0025* (2013.01); *F02D 41/0087* (2013.01); *F02D 41/144* (2013.01); *F02D 41/1497* (2013.01); *F02M 25/028* (2013.01); *F02M 25/03* (2013.01); *F02P 5/145* (2013.01); *F02P 5/152* (2013.01); *F02D 2200/0418* (2013.01); *F02D 2200/101* (2013.01); *F02D 2200/1002* (2013.01); *Y02T 10/121* (2013.01)

(58) Field of Classification Search
CPC ..... F02D 2200/0418; F02D 2200/1002; F02D 2200/101; F02D 35/027; F02D 41/0025; F02D 41/0087; F02D 41/144; F02D 41/1497; F02M 25/0227; F02M 25/028; F02M 25/03; F02P 5/145; F02P 5/152; Y02T 10/121
USPC ..... 123/25 R, 25 A, 25 B, 25 C, 25 J, 25 M, 123/25 N, 198 F, 349, 481
See application file for complete search history.

(56) References Cited

U.S. PATENT DOCUMENTS

| | | | |
|---|---|---|---|
| 4,461,245 | A | 7/1984 | Vinokur |
| 4,558,665 | A | 12/1985 | Sandberg et al. |

(Continued)

FOREIGN PATENT DOCUMENTS

EP 2607647 A1 6/2013

*Primary Examiner* — George C Jin
*Assistant Examiner* — Teuta B Holbrook
(74) *Attorney, Agent, or Firm* — Geoffrey Brumbaugh; McCoy Russell LLP

(57) ABSTRACT

Methods and systems are provided for coordinating water usage with spark usage based on the effect on an engine torque ratio. Water is injected based on torque ratio at a current spark timing relative to torque ratio at borderline knock to improve the impact of the water injection on the engine performance. Manifold water injection and direct water injected are coordinated based on intake manifold humidity.

20 Claims, 5 Drawing Sheets

(51) Int. Cl.
*F02P 5/145* (2006.01)
*F02P 5/152* (2006.01)
*F02D 35/02* (2006.01)

(56) References Cited

U.S. PATENT DOCUMENTS

| | | | |
|---|---|---|---|
| 6,026,641 | A | 2/2000 | Liberty |
| 7,549,408 | B2 | 6/2009 | Russell |
| 8,434,431 | B2 | 5/2013 | Fried et al. |
| 8,522,760 | B2 | 9/2013 | Soltis |
| 8,755,989 | B2 | 6/2014 | Surnilla et al. |
| 8,763,594 | B2 | 7/2014 | Surnilla et al. |
| 9,016,244 | B2 | 4/2015 | Leone et al. |
| 9,169,755 | B2 | 10/2015 | Ulrey et al. |
| 9,291,125 | B2 | 3/2016 | Yoshihara et al. |
| 9,874,163 | B1 | 1/2018 | Hakeem et al. |
| 9,945,310 | B1 | 4/2018 | McQuillen et al. |
| 9,976,502 | B2 | 5/2018 | Hakeem et al. |
| 10,018,156 | B1 | 7/2018 | McQuillen et al. |
| 10,054,036 | B2 | 8/2018 | Hakeem et al. |
| 10,184,429 | B2 | 1/2019 | Hakeem et al. |
| 10,190,541 | B2 | 1/2019 | McQuillen et al. |
| 2007/0119392 | A1* | 5/2007 | Leone .................... F02B 47/02 123/25 C |
| 2007/0119420 | A1* | 5/2007 | Leone ................ F02D 19/0692 123/431 |
| 2007/0215111 | A1 | 9/2007 | Surnilla |
| 2010/0121559 | A1 | 5/2010 | Bromberg et al. |
| 2011/0174267 | A1 | 7/2011 | Surnilla et al. |
| 2012/0024262 | A1* | 2/2012 | Leone .................. F02P 5/1523 123/406.47 |
| 2012/0029795 | A1* | 2/2012 | Surnilla ............... F02D 41/005 701/111 |
| 2013/0218438 | A1 | 8/2013 | Surnilla et al. |
| 2014/0366508 | A1 | 12/2014 | Ulrey et al. |
| 2018/0100457 | A1 | 4/2018 | Shin |
| 2018/0135541 | A1 | 5/2018 | Hsieh et al. |
| 2018/0171891 | A1 | 6/2018 | McQuillen et al. |
| 2018/0171936 | A1 | 6/2018 | McQuillen et al. |

* cited by examiner

METHOD AND SYSTEM FOR ENGINE WATER INJECTION

CROSS REFERENCE TO RELATED APPLICATION

The present application is a divisional of U.S. patent application Ser. No. 15/384,243, entitled "METHOD AND SYSTEM FOR ENGINE WATER INJECTION," filed on Dec. 19, 2016. The entire contents of the above-referenced application are hereby incorporated by reference in its entirety for all purposes.

FIELD

The present description relates generally to methods and systems for controlling water injection into an engine based on torque ratio.

BACKGROUND/SUMMARY

Internal combustion engines may include water injection systems that inject water into a plurality of locations, including an intake manifold, upstream of engine cylinders, or directly into engine cylinders. Injecting water into the engine intake air may increase fuel economy and engine performance, as well as decrease engine emissions. When water is injected into the engine intake or cylinders, heat is transferred from the intake air and/or engine components to the water. This heat transfer leads to evaporation, which results in cooling. Injecting water into the intake air (e.g., in the intake manifold) lowers both the intake air temperature and a temperature of combustion at the engine cylinders. By cooling the intake air charge, a knock tendency may be decreased without enriching the combustion air-fuel ratio. This may also allow for a higher compression ratio, advanced ignition timing, and decreased exhaust temperature. As a result, fuel efficiency is increased. Additionally, greater volumetric efficiency may lead to increased torque. Furthermore, lowered combustion temperature with water injection may reduce NOx, while a more efficient the mixture may reduce carbon monoxide and hydrocarbon emissions.

The cooling effect of water injection advances combustion phasing (e.g., advances the CA50 of engine combustion). This allows fuel efficient spark timing adjustments to be made. One example of adjusting the spark timing with the injection of water is shown by Fried et al. in U.S. Pat. No. 8,434,431. Therein, spark timing is advanced while water is injected into an engine. This, in turn, shifts an engine towards a higher efficiency point.

The inventors herein have recognized potential issues with the approach of '431. As one example, the approach may cause the spark timing to bounce around. For example, prior to water injection, the engine may be operating with spark retarded by a significant amount. Then, the spark timing may be advanced quickly responsive to the water injection. However, due to various engine operating conditions, other than the water injection, that affect the torque, such as the octane rating of the injected fuel, EGR flow rate, manifold humidity, etc., the final engine operating point with the advanced spark and the water injection may not be an optimum one. Consequently, to avoid knock, spark timing may have to be retarded again. The frequent and rapid advancing and retarding of spark timing can result in an unstable torque delivery, increased NVH (noise, vibration, and harshness), and decreased fuel economy. As a result, the full potential of the water injection is not realized.

The inventors herein have recognized that the effect of the water injection on the torque ratio is not the same at all spark conditions. By continuously monitoring the torque ratio, and calibrating the water injection as a function of the torque ratio, spark timing adjustments and water injection adjustments may be better coordinated. In particular, the engine may be operated at the most efficient point while using spark and water optimally. In one example, this is achieved by a method for an engine comprising: adjusting an amount of water injection into an engine responsive to a torque ratio at a current spark timing relative to torque ratio at borderline knock, and further based on sensed humidity in an engine intake manifold.

As an example, when water injection conditions are met, a torque ratio of the current engine operating point (herein also referred to as the current torque ratio) may be determined based on the current spark timing. This torque ratio is then compared to the torque ratio of engine operation at borderline spark (BDL) (herein also referred to as the borderline torque ratio). This includes comparing a magnitude of the difference. In addition, a rate of change of the torque ratio (or torque ratio profile) may be determined for the given engine load condition. If the current torque ratio is within a threshold distance of the borderline torque ratio (such as may occur when spark retard is between 0-5 CAD of MBT), the injection of water may have a minimal effect. During such conditions, the controller may opt to conserve water and rely only on spark usage for torque control. If the torque ratio is more than a threshold distance away from the borderline torque ratio, and further if the torque ratio profile indicates a rapid rate of change (such as may occur when spark retard is between 20-30 CAD of MBT), then the controller may infer that water injection can significantly improve the torque ratio. During such conditions, the controller may opt to inject water at a maximum possible rate while advancing spark timing. For example, water may be injected via a manifold injector until the intake humidity of the manifold reaches a saturation limit. As a result of the water injection, the torque ratio may be moved to a higher efficiency point. Water injection may be reduced after the torque ratio has remained at the higher efficiency point for longer than a threshold duration.

In this way, water injection may be better coordinated with spark usage to leverage the cooling effect of the water injection. The technical effect of using a monitored torque ratio to assess the efficiency improvement of a water injection is that spark timing may be better placed, and the bouncing of spark timing may be reduced. By using water injection based on the real-time effect of the injection on the torque ratio of an engine relative to the torque ratio at BDL, water may be used more judiciously. By limiting water injection to conditions when the engine efficiency improvement is significant, water may be conserved for conditions when it is needed more. As a result, the benefits of water injection may be extended over a longer duration of a drive cycle. By adjusting water usage based on the torque ratio while operating the engine with one or more cylinders deactivated, engine operation in a VDE mode may be extended, improving fuel economy.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 3:
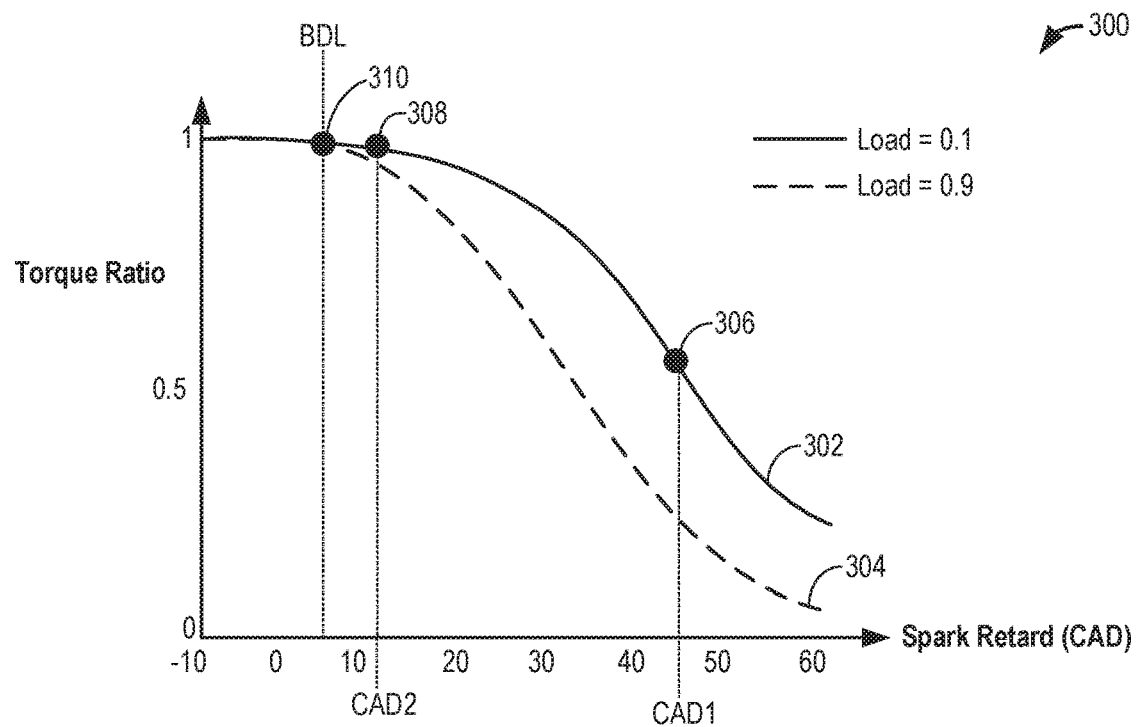
FIG. 3 shows a graph depicting an example change in engine torque ratio with water injection.
Figure 4:
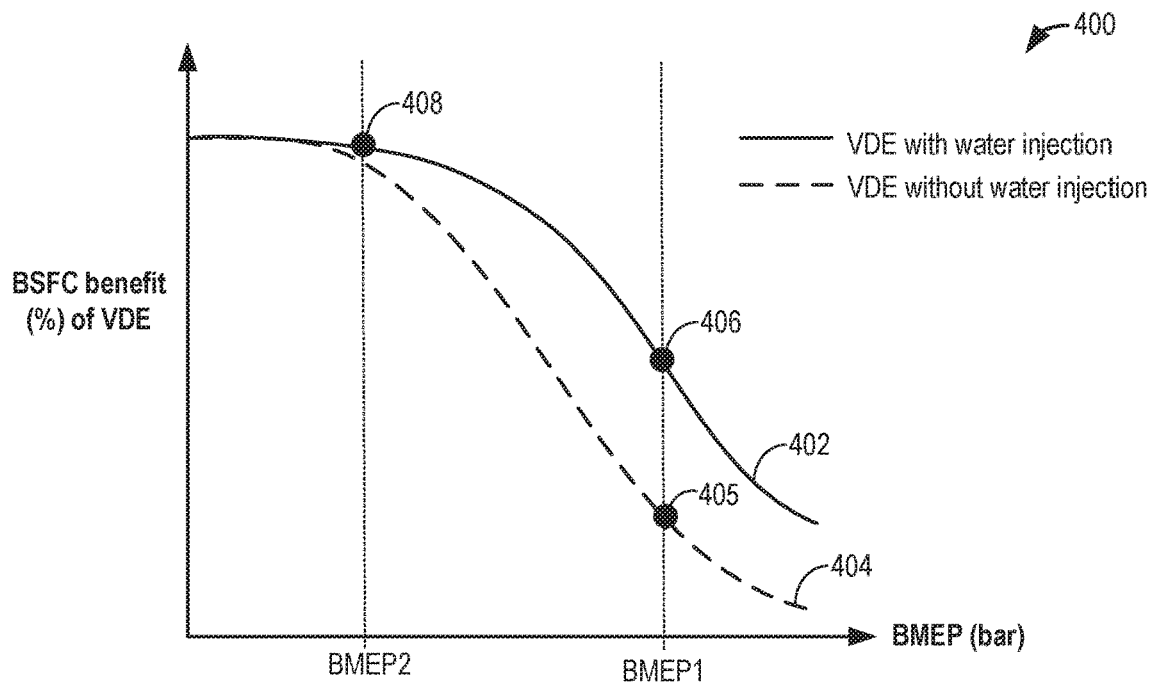
FIG. 4 shows a graph depicting an example change in VDE fuel economy benefit with water injection.

The following description relates to systems and methods for improving the usage of water from a water injection system coupled to a vehicle engine, as described with reference to the vehicle system of FIG. 1. A controller may be configured to perform a control routine, such as the example routine of FIG. 2, to increase or decrease water usage based on the torque ratio of the engine at the time of water injection relative to the torque ratio when the engine is borderline spark limited. This allows the spark advancing effect of the water injection to be leveraged during conditions when the water injection can provide a significant improvement in torque ratio, as depicted at FIG. 3. The controller may also be configured to perform a control routine, such as the example routine of FIG. 5, to similarly use water injection to extend engine operation in a VDE mode based on the torque ratio effect (as depicted at FIG. 4). An example water injection adjustment is shown with reference to FIG. 6. In this way, water usage may be improved to enable significant fuel economy improvements to the vehicle's performance.

Figure 1:
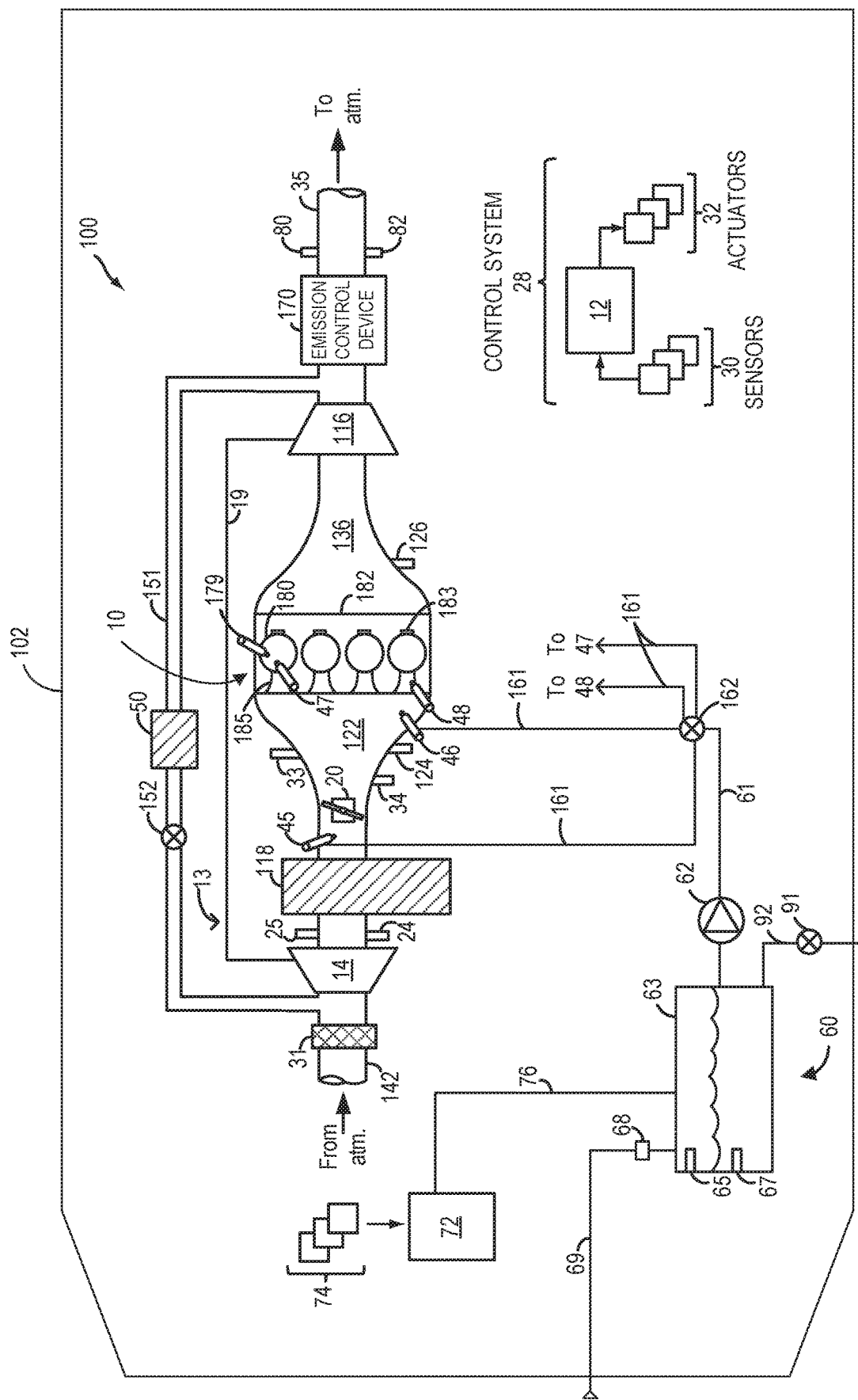
FIG. 1 shows a schematic diagram of an engine system, including a water injection system.

FIG. 1 shows an example embodiment of an engine system 100 configured with a water injection system 60. Engine system 100 is coupled in motor vehicle 102, illustrated schematically. Engine system 100 includes an engine 10, depicted herein as a boosted engine coupled to a turbocharger 13 including a compressor 14 driven by a turbine 116. Specifically, fresh air is introduced along intake passage 142 into engine 10 via air cleaner 31 and flows to compressor 14. The compressor may be a suitable intake-air compressor, such as a motor-driven or driveshaft driven supercharger compressor. In the engine system 100, the compressor is shown as a turbocharger compressor mechanically coupled to turbine 116 via a shaft 19, the turbine 116 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed and other operating conditions.

As shown in FIG. 1, compressor 14 is coupled, through charge air cooler (CAC) 118 to throttle valve (e.g., intake throttle) 20. The CAC may be an air-to-air or air-to-coolant heat exchanger, for example. Throttle valve 20 is coupled to engine intake manifold 122. From the compressor 14, the hot compressed air charge enters the inlet of the CAC 118, cools as it travels through the CAC, and then exits to pass through the throttle valve 20 to the intake manifold 122. In the embodiment shown in FIG. 1, the pressure of the air charge within the intake manifold is sensed by manifold absolute pressure (MAP) sensor 124 and a boost pressure is sensed by boost pressure sensor 24. A compressor by-pass valve (not shown) may be coupled in series between the inlet and the outlet of compressor 14. The compressor by-pass valve may be a normally closed valve configured to open under selected operating conditions to relieve excess boost pressure. For example, the compressor by-pass valve may be opened responsive to compressor surge.

Intake manifold 122 is coupled to a series of combustion chambers or cylinders 180 through a series of intake valves (not shown) and intake runners (e.g., intake ports) 185. As shown in FIG. 1, the intake manifold 122 is arranged upstream of all combustion chambers 180 of engine 10. Additional sensors, such as manifold charge temperature (MCT) sensor 33 and air charge temperature sensor (ACT) 25 may be included to determine the temperature of intake air at the respective locations in the intake passage. The air temperature may be further used in conjunction with an engine coolant temperature to compute the amount of fuel that is delivered to the engine, for example.

Each combustion chamber may further include a knock sensor 183 for identifying and differentiating abnormal combustion events, such as knock and pre-ignition. In alternate embodiments, one or more knock sensors 183 may be coupled to selected locations of the engine block.

The combustion chambers are further coupled to exhaust manifold 136 via a series of exhaust valves (not shown). The combustion chambers 180 are capped by cylinder head 182 and coupled to fuel injectors 179 (while only one fuel injector is shown in FIG. 1, each combustion chamber includes a fuel injector coupled thereto). Fuel may be delivered to fuel injector 179 by a fuel system (not shown) including a fuel tank, a fuel pump, and a fuel rail. Fuel injector 179 may be configured as a direct injector for injecting fuel directly into combustion chamber 180, or as a port injector for injecting fuel into an intake port upstream of an intake valve of the combustion chamber 180.

In the depicted embodiment, a single exhaust manifold 136 is shown. However, in other embodiments, the exhaust manifold may include a plurality of exhaust manifold sections. Configurations having a plurality of exhaust manifold sections may enable effluent from different combustion chambers to be directed to different locations in the engine system. Universal Exhaust Gas Oxygen (UEGO) sensor 126 is shown coupled to exhaust manifold 136 upstream of turbine 116. Alternatively, a two-state exhaust gas oxygen sensor may be substituted for UEGO sensor 126.

As shown in FIG. 1, exhaust from the one or more exhaust manifold sections is directed to turbine 116 to drive the turbine. When reduced turbine torque is desired, some exhaust may be directed instead through a waste gate (not shown), by-passing the turbine. The combined flow from the turbine and the waste gate then flows through emission control device 170. In general, one or more emission control devices 170 may include one or more exhaust after-treatment catalysts configured to catalytically treat the exhaust flow, and thereby reduce an amount of one or more substances in the exhaust flow.

All or part of the treated exhaust from emission control device 170 may be released into the atmosphere via exhaust conduit 35. Depending on operating conditions, however, some exhaust may be diverted instead to an exhaust gas recirculation (EGR) passage 151, through EGR cooler 50 and EGR valve 152, to the inlet of compressor 14. In this manner, the compressor is configured to admit exhaust tapped from downstream of turbine 116. The EGR valve 152 may be opened to admit a controlled amount of cooled exhaust gas to the compressor inlet for desirable combustion and emissions-control performance. In this way, engine system 100 is adapted to provide external, low-pressure (LP) EGR. The rotation of the compressor, in addition to the relatively long LP EGR flow path in engine system 100, provides excellent homogenization of the exhaust gas into the intake air charge. Further, the disposition of EGR take-off and mixing points provides effective cooling of the exhaust gas for increased available EGR mass and increased performance. In other embodiments, the EGR system may be a high pressure EGR system with EGR passage 151 connecting from upstream of the turbine 116 to downstream of the compressor 14. In some embodiments, the MCT sensor 33 may be positioned to determine the manifold charge temperature, wherein the charge may include air and exhaust recirculated through the EGR passage 151.

Intake manifold 122 may further include an intake gas oxygen sensor 34. In one example, the oxygen sensor is a UEGO sensor. The intake gas oxygen sensor may be configured to provide an estimate regarding the oxygen content of fresh air received in the intake manifold. In addition, when EGR is flowing, a change in oxygen concentration at the sensor may be used to infer an EGR amount and used for accurate EGR flow control. In the depicted example, oxygen sensor 34 is positioned downstream of throttle 20 and downstream of charge air cooler 118. However, in alternate embodiments, the oxygen sensor may be positioned upstream of the throttle. Intake oxygen sensor 34 may be used for estimating an intake oxygen concentration and inferring an amount of EGR flow through the engine based on a change in the intake oxygen concentration upon opening of the EGR valve 152. Likewise, intake oxygen sensor 34 may be used for estimating an intake oxygen concentration and inferring an engine dilution or a change in intake humidity based on a change in the intake oxygen concentration following an intake manifold water injection.

Specifically, a change in the output of the sensor upon opening the EGR valve or upon injecting water into the intake manifold is compared to a reference point where the sensor is operating with no EGR or no water injection (the zero point). Based on the change (e.g., decrease) in oxygen amount from the time of operating with no EGR or no water injection, an EGR flow or water flow currently provided to the engine can be calculated. For example, upon applying a reference voltage (Vs) to the sensor, a pumping current (Ip) is output by the sensor. The change in oxygen concentration may be proportional to the change in pumping current (delta Ip) output by the sensor in the presence of EGR or water relative to sensor output in the absence of EGR or water (the zero point). Based on a deviation of the estimated EGR flow from the expected (or target) EGR flow, further EGR control may be performed.

It will be appreciated that the intake oxygen sensor 34 may be operated in various modes based on the engine operating conditions and further based on the nature of the estimation being performed by the sensor. For example, during engine fueling conditions when dilution/EGR estimation is required, the intake oxygen sensor may be operated in a nominal mode with a (fixed) reference voltage applied to the sensor, the reference voltage maintained during the sensing. In one example, the reference voltage may be 450 mV. During other conditions, such as during engine non-fueling conditions (e.g., during a DFSO), when ambient humidity (in the intake aircharge) estimation is required, the intake oxygen sensor may be operated in a variable voltage mode with the reference voltage applied to the sensor modulated. In one example, the reference voltage may be modulated between the nominal reference voltage of 450 mV and a higher reference voltage of 800 mV (or 950 mV). By changing the intake oxygen sensor's reference voltage, or Nernst voltage, the sensor goes from reacting hydrocarbons with ambient oxygen at the sensor to dissociating the products of the reaction (water and carbon dioxide). Combustion chamber 180 also receives water and/or water vapor via water injection system 60. Water from water injection system 60 may be injected into the engine intake or directly into the combustion chambers 180 by one or more of water injectors 45-48. As one example, water may be injected into intake manifold 122, upstream of throttle 20, via water injector 45, herein also referred to as central water injection. As another example, water may be injected into intake manifold 122, downstream of the throttle in one or more locations, via water injector 46. As yet another example, water may be injected into one or more intake runners (e.g., intake ports) 185 via water injector 48 (herein also referred to as port water injection), and/or directly into combustion chamber 180 via water injector 47 (herein also referred to as direct water injection). In one embodiment, injector 48 arranged in the intake runners may be angled toward and facing the intake valve of the cylinder which the intake runner is attached to. As a result, injector 48 may inject water directly onto the intake valve, resulting in faster evaporation of the injected water and a higher dilution benefit from the water vapor. In another embodiment, injector 48 may be angled away from the intake valve and arranged to inject water against the intake air flow direction through the intake runner. As a result, more of the injected water may be entrained into the air stream, thereby increasing the charge cooling benefit of the water injection.

Though only one representative injector 47 and injector 48 are shown in FIG. 1, each of combustion chamber 180 and intake runner 185 may include its own injector. In alternate embodiments, water injection system 60 may include water injectors positioned at one or more of these positions. For example, the engine may include only water injector 46, in one embodiment. In another embodiment, the engine may include each of water injector 46, water injectors 48 (one at each intake runner), and water injectors 47 (one at each combustion chamber).

Water injection system 60 may include a water storage tank 63, a water lift pump 62, a collection system 72, and a water filling passage 69. Water stored in water tank 63 is delivered to water injectors 45-48 via water passage 61 and conduits or lines 161. In embodiments that include multiple injectors, water passage 61 may contain a valve 162 (e.g., diverter valve, multi-way valve, proportioning valve, etc.) to direct water to the different water injectors via the corresponding conduits. Alternatively, each conduit (or water line) 161 may include respective valves within the water injectors 45-48, for adjusting water flow there-through. In addition to water lift pump 62, one or more additional pumps may be provided in conduits 161 for pressurizing the water directed to the injectors, such as in the conduit coupled to direct water injector 47.

Water storage tank 63 may include a water level sensor 65 and a water temperature sensor 67, which may relay information regarding water conditions to controller 12. For example, in freezing conditions, water temperature sensor 67 detects whether the water in tank 63 is frozen or available for injection. In some embodiments, an engine coolant passage (not shown) may be thermally coupled with storage tank 63 to thaw frozen water. The level of water stored in water tank 63, as identified by water level sensor 65, may be communicated to the vehicle operator and/or used to adjust engine operation. For example, a water gauge or indication on a vehicle instrument panel (not shown) may be used to communicate the level of water. If the level of water in the water tank 63 is higher than a threshold level, it may be inferred that there is sufficient water available for injection, and accordingly water injection may be enabled by the controller. Else, if the level of water in the water tank 63 is lower than the threshold level, it may be inferred that there is insufficient water available for injection, and therefore water injection may be disabled by the controller.

In the depicted embodiment, water storage tank 63 may be manually refilled via water filling passage 69 and/or refilled automatically by the collection system 72 via water tank filling passage 76. Collection system 72 may be coupled to one or more vehicle components 74 so that the water storage tank can be refilled on-board the vehicle with condensate collected from various engine or vehicle systems. In one example, collection system 72 may be coupled with an EGR system and/or exhaust system to collect water condensed from exhaust passing through the system. In another example, collection system 72 may be coupled with an air conditioning system (not shown) for collected water condensed from air passing through an evaporator. In yet another example, collection system 72 may be coupled with an external vehicle surface to collect rain or atmospheric condensation. Manual filling passage 69 may be fluidically coupled to a filter 68, which may remove some impurities contained in the water. A drain 92 including a drain valve 91 may be used to drain water from the water storage tank 63 to a location outside the vehicle (e.g., onto the road), such as when a quality of the water is deemed to be lower than a threshold and not suitable for injection into the engine (e.g., due to high conductivity, high particulate matter content). In one example, the quality of the water may be assessed based on the output of a sensor coupled to water injection system 60, in water line 61. For example, the water quality may be assessed based on the output of a conductivity sensor, a capacitance sensor, optical sensor, turbidity sensor, density sensor, or some other type of water quality sensor.

As discussed above, water injection may be used to provide engine dilution and charge cooling benefits, which improve engine fuel economy. In addition, when water is injected, spark timing may be advanced, increasing the engine's torque ratio and thereby moving the engine towards a higher efficiency operating region. The inventors herein have recognized that water injection may be used more judiciously by adjusting the water injection amount based on an expected effect of the water injection on the torque ratio of the engine, as elaborated herein with reference to FIG. 2. In particular, at a given operating point (e.g., for the current engine load), the torque ratio of the engine at the existing spark timing may be compared to the torque ratio of engine operation at borderline spark (BDL), as discussed with reference to FIG. 3. If there is a significant difference between the torque ratios, or if the current operating point is in a region where the torque ratio is rapidly increasing with spark timing retard, the controller may infer that water injection can be advantageously used to improve the torque ratio. Accordingly, water injection may be enabled. Else, if there is a smaller difference between the torque ratios, or if the current operating point is in a region where the torque ratio is not changing significantly with spark timing retard, the controller may infer that water injection will have a minimal effect on the torque ratio. Accordingly, water injection may be disabled to conserve water.

Engine system 100 may have cylinders 180 with selectively deactivatable intake valves and selectively deactivatable exhaust valves. In one example, the intake valves and exhaust valves are configured for cam actuation via individual cam-based cylinder valve actuators. In some embodiments, engine cylinders may be grouped onto distinct engine banks. For example, where the engine 10 is a V8 engine, the engine may be configured with a first and a second bank, each having four cylinders. Each engine bank could then include one camshaft that actuates the intake and exhaust valves of that bank. In an alternate example, each engine bank could include one camshaft actuating intake valves and a separate camshaft actuating exhaust valves. In alternate examples, the valves may be configured for electric valve actuation (EVA) via electric individual cylinder valve actuators. Each cylinder may have a single intake valve and a single exhaust valve, or each cylinder may have a plurality of selectively deactivatable intake valves and/or a plurality of selectively deactivatable exhaust valves.

During selected conditions, such as when the full torque capability of the engine is not needed (such as when engine load is less than a threshold load, or when operator torque demand is less than a threshold demand), one or more cylinders of engine 10 may be selected for selective deactivation (herein also referred to as individual cylinder deactivation, or engine operation in a VDE mode). This may include selectively deactivating one or more cylinders on only the first bank, one or more cylinders on only the second bank, or one or more cylinders on each of the first and second bank. The number and identity of cylinders deactivated on each bank may be symmetrical or asymmetrical.

During the deactivation, selected cylinders may be deactivated by closing the individual cylinder valve mechanisms, such as intake valve mechanisms, exhaust valve mechanisms, or a combination of both. Cylinder valves may be selectively deactivated via hydraulically actuated lifters (e.g., lifters coupled to valve pushrods), via a deactivating follower mechanism in which the cam lift following portion of the follower can be decoupled from the valve actuating portion of the follower, or via electrically actuated cylinder valve mechanisms coupled to each cylinder. In addition, fuel flow and spark to the deactivated cylinders may be stopped, such as by deactivating cylinder fuel injectors.

While the selected cylinders are disabled, the remaining enabled or active cylinders continue to carry out combustion with fuel injectors and cylinder valve mechanisms active and operating. To meet the torque requirements, the engine produces the same amount of torque on the active cylinders. This requires higher manifold pressures, resulting in lowered pumping losses and increased engine efficiency. Also, the lower effective surface area (from only the enabled cylinders) exposed to combustion reduces engine heat losses, improving the thermal efficiency of the engine. Therefore, by extending operating in the VDE mode with one or more cylinders selectively deactivated, engine performance and fuel economy can be improved. As elaborated herein with reference to FIGS. 4-5, an engine controller may be able to further extend operation in the VDE mode by adjusting an amount of water injected into the engine while operating with the one or more cylinders deactivated based on the torque ratio of the engine in the VDE relative to the torque ratio of the engine at borderline spark. In this way, spark usage and water usage can be better coordinated to improve fuel economy.

FIG. 1 further shows a control system 28. Control system 28 may be communicatively coupled to various components of engine system 100 to carry out the control routines and actions described herein. Control system 28 may include an electronic digital controller 12. Controller 12 may be a microcomputer, including a microprocessor unit, input/output ports, an electronic storage medium for executable programs and calibration values, random access memory, keep alive memory, and a data bus. Controller 12 may receive input from a plurality of sensors 30, such as the various sensors of FIG. 1, to receive input including transmission gear position, accelerator pedal position, brake demand, vehicle speed, engine speed, mass airflow through the engine, boost pressure, ambient conditions (temperature, pressure, humidity), etc. Other sensors include CAC 118 sensors, such as CAC inlet air temperature, ACT sensor 125, exhaust pressure and temperature sensors 80, 82, and pressure sensor 124, CAC outlet air temperature sensor, and MCT sensor 33, intake oxygen sensor (IAO2) 34, knock sensor 183 for determining ignition of end gases and/or water distribution among cylinders, and others. The controller 12 receives signals from the various sensors of FIG. 1 and employs the various actuators of FIG. 1 to adjust engine operation based on the received signals and instructions stored on a memory of the controller. For example, injecting water to the engine may include adjusting a pulse-width of injectors 45-48 to vary an amount of water injected while also adjusting a timing of the water injection and a number of injection pulses. In some examples, the storage medium may be programmed with computer readable data representing instructions executable by the processor for performing the methods described below (e.g., at FIGS. 2 and 5) as well as other variants that are anticipated but not specifically listed.

In this way, the system of FIG. 1 enables a vehicle system to adjust an amount of water injection into an engine responsive to a torque ratio at a current spark timing relative to torque ratio at borderline knock, and further based on sensed humidity in an engine intake manifold.

Figure 2:
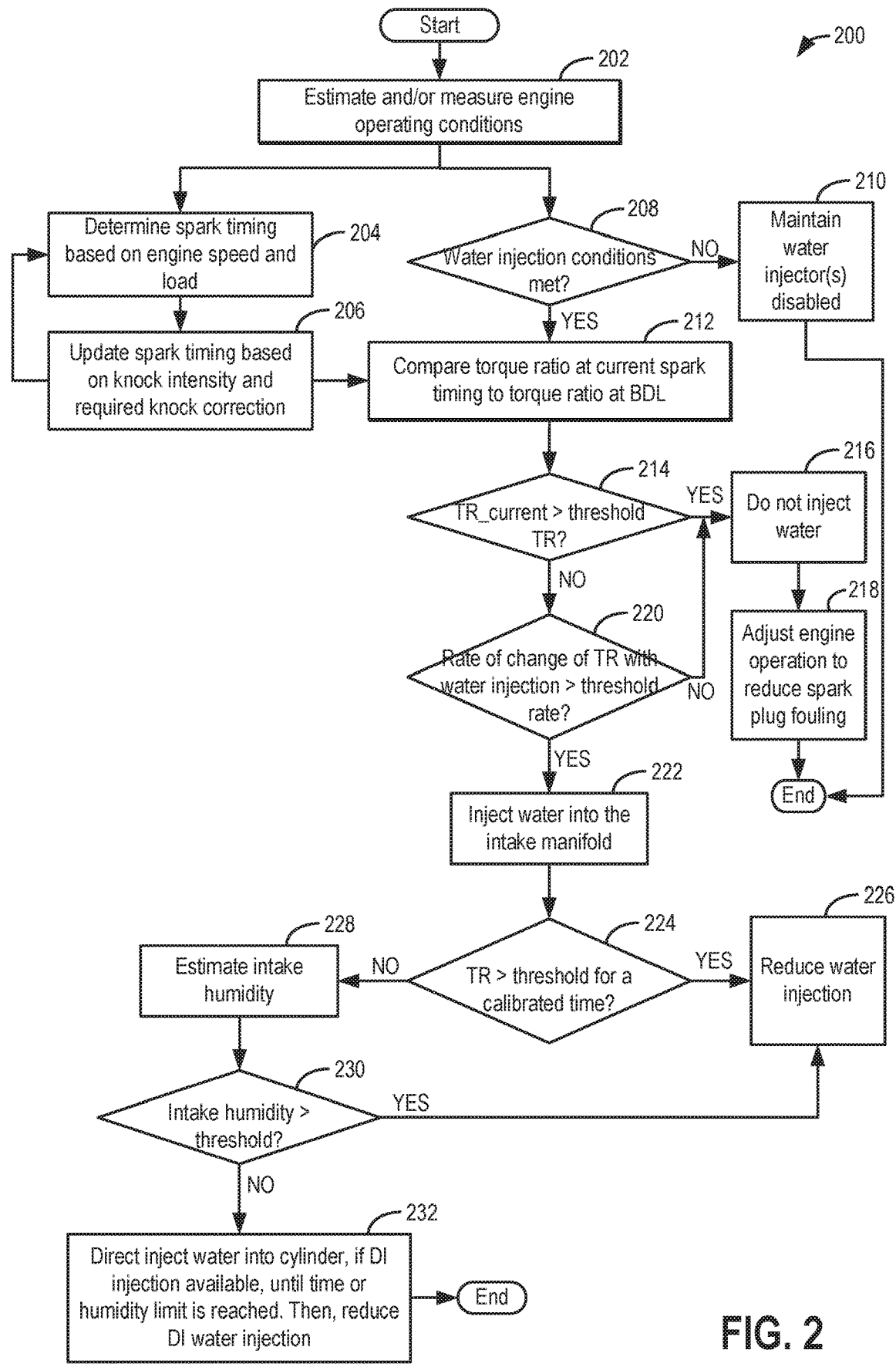
FIG. 2 shows a flow chart of an example method for adjusting engine water injection responsive to a torque ratio.

Turning to FIG. 2, an example method 200 is depicted for adjusting an amount of water injected into an engine responsive to an effect of the water injection on the engine's torque ratio. Injecting water may include injecting water via one or more water injectors of a water injection system, such as the water injection system 60 shown in FIG. 1. Instructions for carrying out method 200 and the rest of the methods included herein may be executed by a controller (such as controller 12 shown in FIG. 1) based on instructions stored on a memory of the controller and in conjunction with signals received from sensors of the engine system, such as the sensors described above with reference to FIG. 1. The controller may employ engine actuators of the engine system to adjust engine operation, according to the methods described below. For example, the controller may send a signal to an actuator for a selected water injector to inject water at a selected location of an engine. The method coordinates water injection into an engine intake manifold with spark usage based on a current torque ratio to provide charge cooling benefits.

The method 200 begins at 202 by estimating and/or measuring engine operating conditions. Engine operating conditions may include driver torque demand, manifold pressure (MAP), air-fuel ratio (A/F), current spark timing, ambient conditions including ambient temperature, pressure, and humidity, boost pressure, an exhaust gas recirculation (EGR) rate, mass air flow (MAF), manifold charge temperature (MCT), engine speed and/or load, an engine knock level, etc.

From 202, the engine controller proceeds to perform both adaptive knock control to control spark retard usage (at 204-206) and water injection control to control water usage (208-232). In addition, the spark timing information is used as an input to adjust the water usage so that use of spark timing retard and water injection can be better coordinated for knock control while improving the overall fuel economy of the engine.

At 204, the method includes determining spark timing based on engine speed and load. As such, the spark timing determined based on engine speed and load may be a base or initial spark timing that is then further adjusted to provide adaptive knock control. For example, at 202, the engine controller may refer a look-up table having engine speed and load as the input and spark timing (e.g., an amount of spark retard to apply) as the output. Alternatively, the controller may use an algorithm to make a logical determination about the spark timing based on logic rules that are a function of the engine speed and load. In one example, the base spark timing may be at MBT (or retarded from MBT by a smaller amount) at lower engine speeds and loads where knock propensity is lower, and the base spark timing may be retarded from MBT (by a larger amount) at higher engine speeds and loads where knock propensity is higher. It will be appreciated that the base spark timing is determined based on a feed-forward likelihood of knock, before knock is indicated. Thus, the base spark timing may be retarded further from MBT for cylinders having a higher knock propensity (e.g., cylinders having a higher knock count, or a previous history of knock occurrence). As such, the base spark timing is selected to provide an expected knock correction, which corresponds to the spark angle retard applied to the optimum ignition timing to eliminate knock. The amount of spark retard at each engine operating point is stored in the controller's memory in a map characterized by engine speed and load. The amount is then retrieved from the memory and reused when the engine is operated at the same operating point.

At 206, the method includes updating the spark timing based on sensed knock intensity and the required knock correction. That is, the base spark timing is adjusted based on feedback knock. For example, responsive to the indication of knock, spark timing may be (further) retarded from MBT. The controller may increase the degree of spark retard applied as the sensed knock intensity increases. For example, the controller may use a look-up table (or an algorithm) that uses feedback knock as an input and provides a (further) degree of spark retard to be applied as an output. In this way, the controller may adjust the spark timing based on each of a current engine speed and a current engine load, and further based on feedback from an engine knock sensor. In another example, responsive to no indication of knock, spark timing may be gradually advanced (towards MBT). The rate of retarding spark responsive to sensed knock may be higher than the rate of advancing spark responsive to knock not being detected.

In addition to updating the spark timing setting based on engine speed and load, a borderline spark setting (BDL) may also be determined. BDL corresponds to the most advanced spark setting that can be used at a given operating condition before knocking occurs.

In parallel to performing knock adaptive spark timing control, the method at 202 continues to 208 wherein water injection control is initiated by determining whether water injection conditions are met. Water injection may be requested to leverage one or more benefits associated with water injection. For example, water injection may be requested at low-mid engine loads to increase charge dilution, thereby improving combustion stability in the low-mid load engine operating region. As another example, water injection may be requested at mid-high engine loads to increase charge cooling, thereby improving knock relief in the mid-high load engine operating region. Further still, water injection may be requested at high loads to provide component cooling, such as to cool the exhaust gas, cool an exhaust catalyst, etc. Water injection conditions may be considered met responsive to engine load being higher than a threshold load (below which engine combustion stability may be affected) and spark timing being retarded (e.g., from MBT) by more than a threshold amount.

Confirming that water injection conditions have been met may further include confirming that water is available for injection by estimating and/or measuring water availability. Water availability for injection may be determined based on the output of a plurality of sensors, such as a water level sensor, a water quality sensor, and/or a water temperature sensor disposed in the water storage tank of the water injection system of the engine (such as water level sensor 65 and water temperature sensor 67 shown in FIG. 1). For example, water in the water storage tank may be unavailable for injection in freezing conditions (e.g., when the water temperature in the tank is below a threshold level, where the threshold level is at or near a freezing temperature). In another example, the level of water in the water storage tank may be below a threshold level, where the threshold level is based on an amount of water required for an injection event or a period of injection cycles.

If water injection conditions are not met, at 210, the method includes disabling water injection. In one example, where water injection conditions are not met due to water injection not being requested, the method includes continuing engine operation without water injection. In another example, where water injection conditions are not met due to water not being available for injection, such as when the water level of the water storage tank is below a threshold level, the controller may indicate that refilling of the tank is required. In addition, the controller may refill the water tank by increasing on-board collection of water from one or more vehicle systems, such as by collecting water from a water collection system coupled to a water storage tank of a water injection system of the engine (such as water collection system 72 shown in FIG. 1). This includes increasing air conditioning (AC) condenser operation to increase AC condensate collection, increasing EGR condensate collection, increasing CAC condensate collection, etc.

However, if water injection conditions are met, at 212, the method includes comparing a torque ratio at the current spark timing to a torque ratio at borderline. The controller may retrieve the current spark timing from the adaptive spark control performed at 204-206. The torque ratio at the current spark timing corresponds to a ratio of torque at the current spark timing (e.g., with the determined amount of spark retard) relative to torque at MBT timing. Likewise, the torque ratio at borderline corresponds to a ratio of torque at the current BDL setting relative to torque at MBT timing.

As such, for a given engine operating point (e.g., a given engine load), the torque ratio changes with spark timing. In addition, various other engine operating parameters may affect the torque ratio, such as fuel octane (or alcohol content), ambient or intake air humidity, fuel split ratio, EGR flow rate, etc. The controller may refer a map, such as the example map of FIG. 3, to compare the final torque ratios of a given mixture (including air, fuel, and humidity factors) at the current spark timing relative to the BDL torque ratio. As elaborated below, comparing the torque ratios may include comparing the torque ratio values to learn an absolute difference, or comparing the torque ratios to learn a rate of change from the torque ratio at the current spark setting to the torque ratio at BDL. The controller may then adjust water usage based on the comparing.

FIG. 3 depicts an example change in engine torque ratio. Map 300 depicts a first torque ratio profile at a first, lower engine load (e.g., load of 0.1) at plot 302 (solid line) and second torque ratio profile at a second, higher load (e.g., a load of 0.9) at plot 304 (dashed line). As the engine load increases, there is a corresponding increase in knock likelihood. This results in the use of more spark timing retard which causes a drop in the torque ratio. In the depicted example, the torque ratio at BDL for the given engine load is depicted at point 310.

The cooling effect of water injection results in an advance in combustion phasing (that is, advanced CA50). This results in an enhanced torque ratio. In other words, at a given load, water injection can be used to provide charge cooling, which reduces the amount of spark retard that needs to be applied. Consequently, as water is injected, a current torque ratio of the engine can be moved closer to the torque ratio at BDL. As an example, by injecting water, the current torque ratio of the engine can be moved from point 306 to point 308 along torque ratio profile 302. By comparing the position of the torque ratio at the current spark timing to the torque ratio at BDL on the torque profile for a given engine load (and fuel, humidity, and EGR combination), a controller can determine whether to inject water or conserve water for later use.

For example, when the engine is operating with a current spark timing of CAD1, which is more retarded from MBT, the engine may have a current torque ratio depicted by point 306. The controller may determine that the current torque ratio is more than a threshold distance from the BDL torque ratio depicted by point 310. The controller may further determine, based on the position of point 306 on torque profile 302, that there is a rapid rate of change in the torque ratio with an advance in the combustion phasing. That is, for every degree of spark timing advance relative to CAD1, there is a larger increase in the current torque ratio, and the current torque ratio starts approaching the BDL torque ratio faster. Therefore at this time, water injection can have a larger effect on the torque ratio and therefore a larger fuel economy and performance benefit. Accordingly when the adaptive knock controlled spark timing is determined to be CAD1, based on the comparison between the torque ratio at the current spark timing (at 306) relative to the torque ratio at borderline (at 310), the controller may determine that water injection should be enabled and the water injection amount should be adjusted (e.g., increased).

In an alternate example, when the engine is operating with a current spark timing of CAD2, which is less retarded from MBT, the engine may have a current torque ratio depicted by point 308. The controller may determine that the current torque ratio is less than a threshold distance from the BDL torque ratio depicted by point 310. The controller may further determine, based on the position of point 308 on torque profile 302, that there is a slow rate of change in the torque ratio with an advance in the combustion phasing. That is, for every degree of spark timing advance relative to CAD2, there is a smaller increase in the current torque ratio. Therefore at this time, water injection may have a minimal effect on the torque ratio. Accordingly when the adaptive knock controlled spark timing is determined to be CAD2, based on the comparison between the torque ratio at the current spark timing (at 308) relative to the torque ratio at borderline (at 310), the controller may determine that water injection should be disabled and the water injection amount is decreased. By disabling water injection and relying only on spark retard for knock control at this time, water may be conserved for a later time and used only when its impact on combustion phasing advance and torque ratio is higher.

Returning to FIG. 2, at 214, the method includes determining whether the current torque ratio (that is, the torque ratio at the current spark timing) is greater than a threshold torque ratio. In one example, the threshold torque ratio is based on the borderline torque ratio (e.g., a function of the borderline torque ratio). The threshold torque ratio may be set such that when the current torque ratio is higher than the threshold torque ratio, the current torque ratio is closer to the borderline torque ratio. In an alternate example, it may be determined if the current torque ratio is within a threshold distance of the borderline torque ratio. If the current torque ratio is within a threshold distance of the borderline torque ratio (such as may occur when spark retard is between 0-5 CAD of MBT), the injection of water may have a minimal effect, as elaborated with reference to FIG. 3. Thus, if the current torque ratio is greater than the threshold torque ratio, the method continues to 216 where water is not injected for knock control. This may include maintaining water injectors disabled. Alternatively, this may include maintaining water injection at current levels (e.g., for charge dilution purposes) and not increasing water injection to provide knock relief. In addition, the adaptive spark timing for knock control is maintained. Then, at 218, the method includes adjusting engine operation to reduce spark plug fouling. For example, spark timing retard may be maintained for a duration and/or ignition output intensity may be increased to reduce spark plug fouling. In this way, water may be conserved for conditions when water injection would provide a greater benefit and spark timing is adjusted for knock control.

If the current torque ratio is not greater than the threshold torque ratio, at 220, the method includes determining, based on the torque ratio profile for the current engine load, whether a (predicted or expected) rate of change of the torque ratio with water injection is greater than the threshold rate. For example, with reference to FIG. 3, it may be determined if, for the given engine load, whether the torque ratio at the current spark timing is at a position on the torque ratio profile where there is a higher than threshold rate of change in the spark timing advance direction. If the rate of change of the torque ratio with water injection is not greater than the threshold rate, such as when the current torque ratio is in a plateau region of the torque ratio profile, it may be inferred that water usage may have a minimal effect on the torque ratio, and therefore the method continues to 216 where water is not injected.

However, if the rate of change of the torque ratio with water injection is greater than the threshold rate, such as when the current torque ratio is in a sloped region of the torque ratio profile, at 222, the method includes injecting water into the intake manifold. As described above with regard to FIG. 3, if the current torque ratio is greater than the threshold distance away from the borderline torque ratio and the torque ratio profile indicates a rate of change with water injection that is greater than the threshold rate, the torque ratio may be improved by water injection. Thus, at 222, the controller may enable the manifold water injector and inject water from a manifold water injector, for example at a maximum rate. The controller may send a pulse-width signal to the manifold injector to inject an amount of water that provides knock relief. Alternatively, if water injection was already enabled (e.g., for dilution control), then the controller may increase water injection for knock control. The amount of water injected may be based on the feed-forward and feedback indication of knock. In response to water injection, spark timing may be correspondingly advanced, and the combustion phasing advance results in an increase in the torque ratio towards the BDL torque ratio, thereby improving engine efficiency. In this way, water may be used for knock control during conditions when water injection provides a greater fuel economy benefit.

Following water injection, at 224, the method includes determining whether the current torque ratio with water injection has been greater than the threshold torque ratio for a calibrated amount of time. For example, it may be determined if the current torque ratio with water injection has been at or near the borderline torque ratio for longer than the calibrated amount of time (e.g., for a number of combustion events, for a duration or distance of vehicle travel, etc.). If the torque ratio is greater than the threshold for the calibrated time, it may be inferred that continued water injection will not provide any further improvement in torque ratio, and therefore at 226, the method includes reducing water injection. For example, manifold water injection may be disabled and the controller may resume only spark usage for adaptive knock control.

If the torque ratio is not greater than the threshold for the calibrated time, at 228, the method includes estimating intake humidity. In one example, the intake humidity is sensed via a humidity sensor coupled to the engine intake manifold. In another example, the intake humidity is sensed via an intake oxygen sensor coupled to the engine intake manifold. At 230, the method includes determining whether the intake humidity is greater than a threshold. As such, manifold water injection can provide charge cooling benefits until a saturation limit is reached. The saturation limit may be reached when the intake manifold humidity reaches a threshold and/or when the manifold water injection reaches a maximum flow rate. If the intake humidity is greater than the threshold, the method returns to 226 wherein water injection is reduced. The reduction in water injection may be based on the difference between the sensed intake humidity and the threshold, the water injection pulse-width reduced further as the difference increases. Alternatively, responsive to the sensed intake humidity exceeding the threshold, manifold water injection may be disabled. In this way, the controller may increase the amount of water injected into an intake manifold of the engine while the torque ratio at the current spark timing is below the threshold torque ratio (or borderline torque ratio) until the sensed humidity in the intake reaches a limit.

If intake humidity is not greater than the threshold, it may be inferred that further water injection is possible for torque ratio improvement. Accordingly the method continues at 232 wherein the method includes direct injecting water into one or more cylinders, if direct injection is available, until a time or a humidity limit is reached (as described at 224 and 230). Since water is injected at 222 into the intake manifold at a maximum rate, and further manifold water injection is not possible, the controller employs direct injectors if the intake humidity is not above the threshold humidity at 232. The controller may send a pulse-width signal to the direct injector to inject an amount of water directly into the cylinder based on a difference between the current torque ratio (with manifold water injection) and the borderline torque ratio. For example, as the difference increases, the pulse-width signal sent to the direct water injector may be increased. The controller may continue delivering water to the engine via manifold water injection (at the maximal rate) and direct water injection to keep the torque ratio above the threshold (e.g., close to the BDL torque ratio) until the torque ratio remains high for longer than a threshold duration or until the intake humidity limit is reached. Once the time or humidity limit is reached, the method at 232 includes reducing direct water injection. For example, direct water injection may be disabled. Thus, after reaching a saturation limit for the manifold injection, the controller may direct inject water into an engine cylinder until the torque ratio reaches the threshold, and then disable water injection.

In this way, water injection usage may be adjusted responsive to the torque ratio at the current spark timing relative to the torque ratio at borderline spark to improve judicious water usage. An engine controller may adjust an amount of water injection into an engine responsive to a torque ratio at a current spark timing relative to torque ratio at borderline knock, and further based on sensed humidity in an engine intake manifold. As used herein, the torque ratio at the current spark timing includes the torque ratio before the adjusted amount of water is injected into the engine. The adjusting may include reducing the amount of water injected into the engine as the torque ratio at the current spark timing approaches a threshold, the threshold based on the torque ratio at borderline knock. The method of claim 1, wherein the adjusting includes reducing the amount of water injected into the engine responsive to the torque ratio at the current spark timing exceeding a threshold for longer than a duration, the threshold based on the torque ratio at borderline knock. The controller may reduce the amount of water injected into the engine as the torque ratio at the current spark timing approaches the torque ratio at borderline knock. The controller may advance spark timing from the current spark timing while injecting the adjusted amount of water.

Torque ratio comparisons can also be used to adjust water injection during engine operation with selective cylinder deactivation. For example, water may be injected to enable engine operation with selective cylinder deactivation to be extended. The controller may compare the torque ratio improvement (relative to borderline torque ratio) with water injection while operating in a VDE mode with one or more cylinder deactivated to the torque ratio improvement without water injection (and with more spark timing retard) while operating the engine in a non-VDE mode with all cylinders active. Based on the comparison, the controller may adjust water injection and the mode of engine operation. As elaborated below, the controller may selectively deactivate one or more engine cylinders responsive to the current engine load being lower than a threshold, and adjust a duration of operation with the one or more cylinders deactivated based on a torque ratio with the adjusted amount of water injected relative to torque ratio at borderline knock. For example, the controller may extend engine operation with the one or more cylinders deactivated when a difference between the torque ratio with the adjusted amount of water and the torque ratio at borderline knock exceeds a threshold difference. Else, when the difference between the torque ratio with the adjusted amount of water and the torque ratio at borderline knock is less than the threshold difference, the controller may reactivate the one or more deactivated cylinders while disabling water injection.

Figure 5:
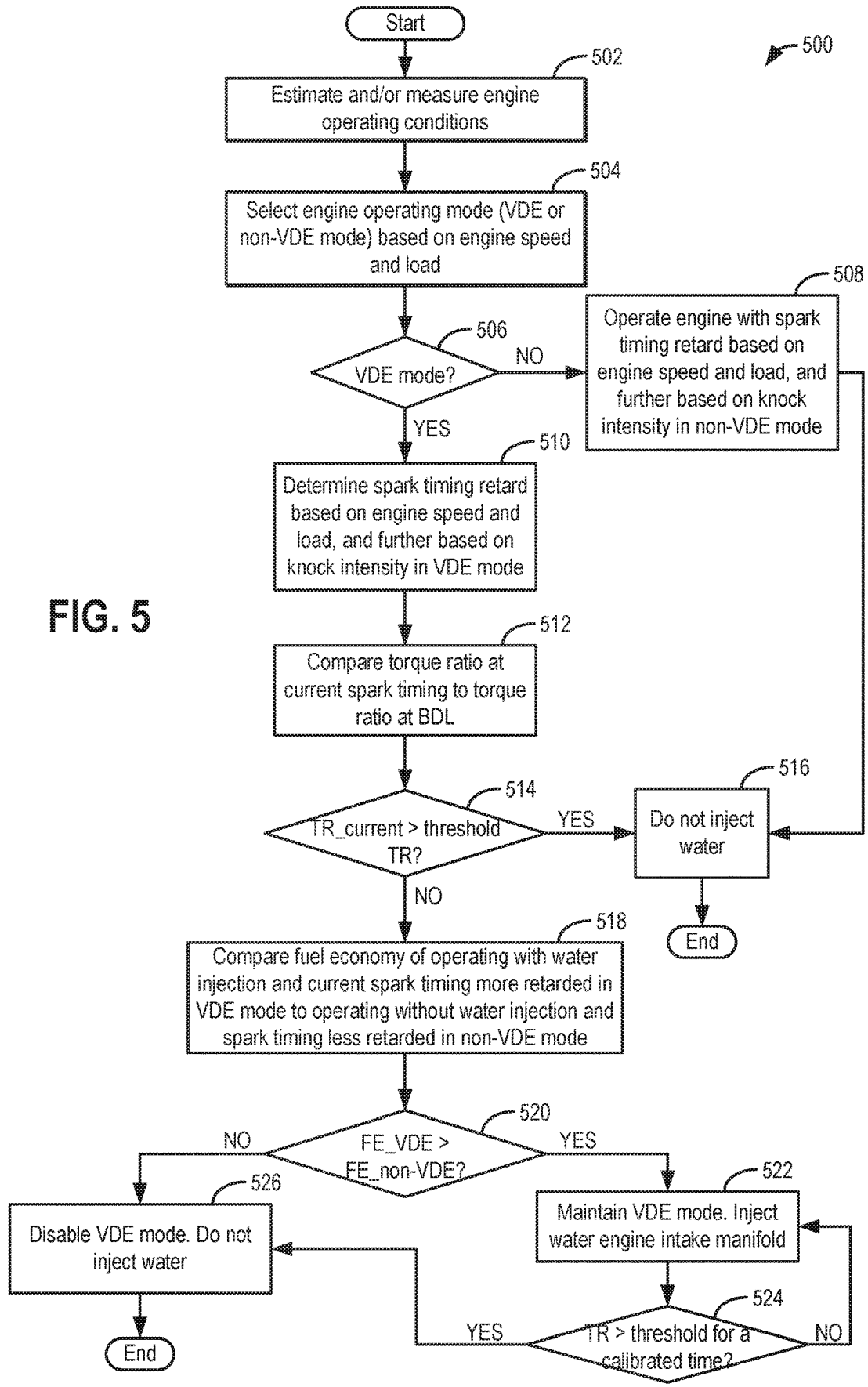
FIG. 5 shows a flow chart of an example method for using water injection to extend engine operation in a VDE mode.

FIG. 5 shows an example method 500 for using water injection to extend engine operation in a variable displacement engine (VDE) mode. Similar to the method 200 shown in FIG. 2, in method 500, the controller may adjust water injection based on torque ratio to extend engine operation in VDE mode.

The method 500 begins at 502 by estimating and/or measuring engine operating conditions. Engine operating conditions estimated may include manifold pressure (MAP), ambient conditions (ambient temperature, pressure, humidity), exhaust air-fuel ratio (A/F), exhaust gas recirculation (EGR) flow rate, mass air flow (MAF), manifold charge temperature (MCT), engine speed and/or load, driver torque demand, engine temperature, exhaust catalyst temperature, etc. At 504, the method includes selecting an engine operating mode (VDE or non-VDE mode) based on engine speed and load. The controller may select VDE mode and disable one or more engine cylinders, for example a selected group of cylinders, such as a bank of cylinders, in response to engine speed/load being lower than a threshold to increase fuel economy. As the engine speed/load increases, the controller may switch to a non-VDE mode and reactivate previously deactivated cylinders.

Next, at 506, the method includes determining whether the engine is operating in VDE mode. If VDE mode has not been selected, at 508, the method includes operating the engine with all cylinders active, and with spark timing retarded from MBT by an amount based on the engine speed and average cylinder load, and further based on sensed knock intensity in the non-VDE mode. The amount of spark timing retard applied may be determined via adaptive spark control, as discussed earlier with reference to FIG. 2 at 204-206. In one example, the engine may be operating with a first amount of spark timing retard when operating in the non-VDE mode. The engine controller may refer a look-up table having engine speed and load as the input and base/initial spark timing (e.g., an amount of spark retard from MBT to apply) as the output. The spark timing is then updated based on sensed knock intensity and the required knock correction. For example, responsive to detected knock in the non-VDE mode, spark timing may be (further) retarded from MBT. The controller may increase the degree of spark retard applied as the sensed knock intensity increases. For example, the controller may use a look-up table (or an algorithm) that uses feedback knock as an input and provides a (further) degree of spark retard to be applied as an output. In addition to updating the spark timing setting based on engine speed and load, a borderline spark setting (BDL) may also be determined. BDL corresponds to the most advanced spark setting that can be used at a given operating condition before knocking occurs. Then, the method continues to 516 where the controller does not inject water. This includes disabling water injectors, or maintaining the injectors disabled.

However, if the engine is operating in the VDE mode, at 510, the method includes determining spark timing retard based on engine speed and average cylinder load in the VDE mode, and further based on sensed knock intensity in VDE mode. As such, the average cylinder load in the VDE mode may be higher than the average cylinder load in the non-VDE mode. The amount of spark timing retard applied may be determined via adaptive spark control. In one example, the engine may be operating with a second, different amount of spark timing retard when operating in the non-VDE mode. The second amount of spark timing retard applied when operating in the non-VDE mode may be more retarded from MBT than the first amount of spark timing retard. The engine controller may refer a look-up table having engine speed and load as the input and base/initial spark timing (e.g., an amount of spark retard from MBT to apply) as the output. The spark timing is then updated based on sensed knock intensity and the required knock correction. For example, responsive to detected knock in the VDE mode, spark timing may be (further) retarded from MBT. The controller may increase the degree of spark retard applied as the sensed knock intensity increases. For example, the controller may use a look-up table (or an algorithm) that uses feedback knock as an input and provides a (further) degree of spark retard to be applied as an output. In addition to updating the spark timing setting based on engine speed and load, a borderline spark setting (BDL) may also be determined.

At 512, while operating in the VDE mode, the method includes comparing the torque ratio at the current spark timing to the torque ratio at BDL. As such, for a given engine operating point (e.g., a given engine load), the torque ratio changes with spark timing. In addition, water injection allows for combustion phasing advance, which results in an increase in torque ratio. The controller may refer a map, such as the example maps of FIGS. 3-4, to compare the final torque ratios of a given engine mixture (including air, fuel, and humidity factors) while operating in the VDE mode at the current spark timing relative to the BDL torque ratio. As elaborated below, comparing the torque ratios may include comparing the torque ratio values to learn an absolute difference, or comparing the torque ratios to learn a rate of change from the torque ratio at the current spark setting to the torque ratio at BDL. The controller may then adjust water usage based on the comparing. Next, at 514, the method includes determining whether the current torque ratio (that is, the torque ratio in the VDE mode with the first amount of spark retard) is greater than a threshold torque ratio. In one example, the threshold torque ratio is based on the borderline torque ratio (e.g., a function of the borderline torque ratio). The threshold torque ratio may be set such that when the current torque ratio is higher than the threshold torque ratio, the current torque ratio is closer to the borderline torque ratio. In an alternate example, it may be determined if the current torque ratio is within a threshold distance of the borderline torque ratio. If the current torque ratio is greater than the threshold torque ratio, it may be inferred that water injection at this operating point has a minimal effect of the fuel economy benefit, and therefore it may be better to conserve water and rely on spark usage for knock control. Accordingly, the method continues to 516 wherein engine operation in the VDE mode with the first amount of spark timing retard is continued and water is not injected. This includes disabling manifold water injectors, or maintaining water injectors disabled.

If the current torque ratio is not greater than the threshold torque ratio, the method continues to 518 wherein the controller compares a fuel economy of operating the engine with water injection enabled and current spark timing more retarded in the VDE mode to operating the engine without water injection and spark timing less retarded in the non-VDE mode.

An example of changes to a fuel economy benefit of operating in VDE mode with and without water injection is shown at map 400 of FIG. 4. In one example, the map of FIG. 4 may be stored in the engine controller's memory. The controller may reference the map during engine operation to compare the fuel economy benefit of operating in non-VDE mode to extending VDE mode operation with water injection. For example, the controller may determine whether to operate in the VDE mode with water injection by comparing the fuel economy benefit of operating in the VDE mode with and without water injection.

Map 400 shows the fuel consumption (e.g. brake specific fuel consumption) benefit of operating in the VDE mode as a percent benefit at a given brake mean effective pressure (BMEP) with water injection (at profile 402, solid line) and without water injection (at profile 404, dashed line). At low load conditions, the difference in the fuel consumption benefit of VDE with water injection compared to without water injection is relatively small, such as at 408 of plot 402. In contrast, at high loads, there is a greater fuel consumption benefit of VDE with water injection compared to without water injection at 406 of plot 402. As engine load increases in the VDE mode, the controller may compare the increased fuel economy of operating in VDE mode with water injection, shown in map 400, to the fuel economy of operating in non-VDE mode to determine whether to continue VDE operation. The cooling effect of water injection results in an advance in combustion phasing (that is, advanced CA50). This results in an enhanced torque ratio and thereby an improvement in fuel economy. In other words, at a given load while operating in the VDE mode, water injection can be used to provide charge cooling, which reduces the amount of spark retard that needs to be applied for that load to provide knock control. Consequently, as water is injected, a current torque ratio of the engine can be moved closer to the torque ratio at BDL, as described earlier with reference to FIG. 3. Since the effect of water injection on torque ratio varies with spark timing, and since spark timing is selected based on engine load, the fuel economy benefit of water injection during the VDE mode varies with load. For example, the fuel economy benefit at BMEP1 can be moved from point 405 on profile 404 to point 406 on profile 402 by injecting water. This allows operation in the VDE mode to be extended.

Further, based on the load at which water is injected, the torque ratio, and thereby the fuel economy benefit can vary. Based on the position of the engine operating point on profile 402, the controller can determine whether to inject water while staying in the VDE mode or conserve water for later use while reactivating all cylinders and transitioning to the non-VDE mode.

For example, when the engine is operating at BMEP1, the engine may have a fuel consumption benefit depicted by point 406. The controller may determine that at this operating point, there is a rapid rate of change in the fuel economy benefit with an advance in the combustion phasing. Therefore at this time, water injection can have a larger effect on the torque ratio and therefore a larger fuel economy and performance benefit in the VDE mode. Accordingly, when the engine is at operating point 406 in the VDE mode, the controller may determine that water injection should be enabled and the water injection amount should be adjusted (e.g., increased). This includes enabling manifold water injection. In addition, as water is injected, spark timing for the given load in the VDE mode can be advanced. For example, the first amount of spark timing that was applied in the VDE mode can be reduced.

In an alternate example, when the engine is operating at BME2, the engine may have a fuel consumption benefit depicted by point 408. The controller may determine that at this operating point, there is a slower rate of change in the fuel economy benefit with an advance in the combustion phasing. Therefore at this time, water injection may have a smaller effect on the torque ratio and therefore a smaller fuel economy and performance benefit in the VDE mode.

Accordingly, when the engine is at operating point 408 in the VDE mode, the controller may determine that water injection should be disabled.

Returning to FIG. 5, at 520, the method includes determining whether the fuel economy benefit of operating in VDE mode with water injection and spark less retarded is greater than the fuel economy benefit of operating in the non-VDE mode with no water injection and spark more retarded. In one example, the controller may compare the BSFC value of operating in the VDE mode with water injection and spark less retarded to the BSFC value of operating in the non-VDE mode with no water injection and spark more retarded. The setting having the lower BSFC value may be selected as the setting having the higher fuel economy benefit.

If the fuel economy benefit of operating in the VDE mode is greater than the fuel economy benefit of operating in the non-VDE mode, the method continues to 522 wherein VDE mode is maintained and water is injected at the engine intake manifold. As a result of operating with water injection in the VDE mode, the engine may be operated more efficiently at a higher torque ratio (e.g., a torque ratio that is closer to BDL torque ratio). In this way, water injection may be used to extend VDE mode operation by providing charge cooling and associated combustion phasing advance, thereby increasing the fuel economy benefits of operating in the VDE mode.

Next, at 524, while operating in the VDE mode with water injection enabled, the method includes determining whether the torque ratio is greater than a threshold for a calibrated time. For example, it may be determined if the current torque ratio in the VDE mode with water injection has been at or near the borderline torque ratio in the VDE mode for longer than the calibrated amount of time (e.g., for a number of combustion events, for a duration or distance of vehicle travel, etc.). If the torque ratio is not greater than the threshold for the calibrated time, the method returns to 522. However, if the torque ratio is greater than the threshold for the calibrated time, it may be inferred that continued water injection will not provide any further improvement in torque ratio and fuel economy, and therefore at 526, the method includes disabling the VDE mode and not injecting water. Disabling the VDE mode includes reactivating all previously deactivated cylinders and operating the engine with all cylinders active. In addition, spark timing may be adjusted for the non-VDE mode. The controller may resume only spark usage for adaptive knock control in the no-VDE mode. For example, a larger amount of spark timing retard (e.g., the second amount of spark retard) may be applied.

Returning to the method 520, if the fuel economy of operating in the VDE mode with water injection is lower than the fuel economy of operating in the non-VDE mode, the method continues to 526 wherein VDE is disabled and water is not injected.

In this way, responsive to a change in engine load, a controller may select between operating an engine with one or more cylinders deactivated while water is injected into an intake manifold, and operating the engine with all cylinders active and water injection disabled based on a torque ratio at a current spark timing relative to torque ratio at borderline knock. The selecting may be further based on sensed humidity in the intake manifold, the humidity sensed via an intake manifold sensor. For example, the controller may select between operating the engine in a VDE mode with one or more cylinders deactivated while operating with a first spark timing or operating the engine in a non-VDE mode with all cylinders active while operating with a second, different spark timing. The controller may select the engine operating mode based on a comparison of a first value of the torque ratio at the first spark timing relative to torque ratio at borderline knock, and a second value of the torque ratio at the second spark timing relative to torque ratio at borderline knock. As an example, the second spark timing applied with all cylinders active may be more retarded than the first spark timing applied with one or cylinder deactivated. The selecting may include operating the engine with the one or more cylinders deactivated and water injected into the intake manifold when a first difference between the torque ratio at the first spark timing and the torque ratio at borderline knock is larger than a second difference between the torque ratio at the second spark timing and the torque ratio at borderline knock. This allows water injection to be used to extend the VDE mode. The controller may operate the engine with all cylinders active and water injection disabled when the second difference is larger than the first difference. This allows water usage to be conserved. Alternatively, the controller may operate the engine with the one or more cylinders deactivated and water injected into the intake manifold when the first difference between the torque ratio at the first spark timing and the torque ratio at borderline knock is higher than a threshold and the second difference between the torque ratio at the second spark timing and the torque ratio at borderline knock is lower than the threshold. The controller may operate the engine with all cylinders active and water injection disabled when the first difference between the torque ratio at the first spark timing and the torque ratio at borderline knock is lower than the threshold and the second difference between the torque ratio at the second spark timing and the torque ratio at borderline knock is higher than the threshold. Further, while operating the engine with the one or more cylinders deactivated and water injection enabled, responsive to the torque ratio at the first spark timing being higher than a threshold for a duration, the controller may reactivate the cylinders and disable the water injection, the threshold based on the torque ratio at borderline knock. This enables water usage to be limited when the current torque ratio has remained elevated close to the BDL torque ratio for a duration. Furthermore, the controller may continue injecting water into the intake manifold until the sensed humidity is at a threshold humidity, and then disable water injection and reactivate the one or more deactivated cylinders even if the first difference is larger than the second difference. This also allows water usage to be conserved when water injection benefits are reduced due to the presence of ambient humidity.

Figure 6:
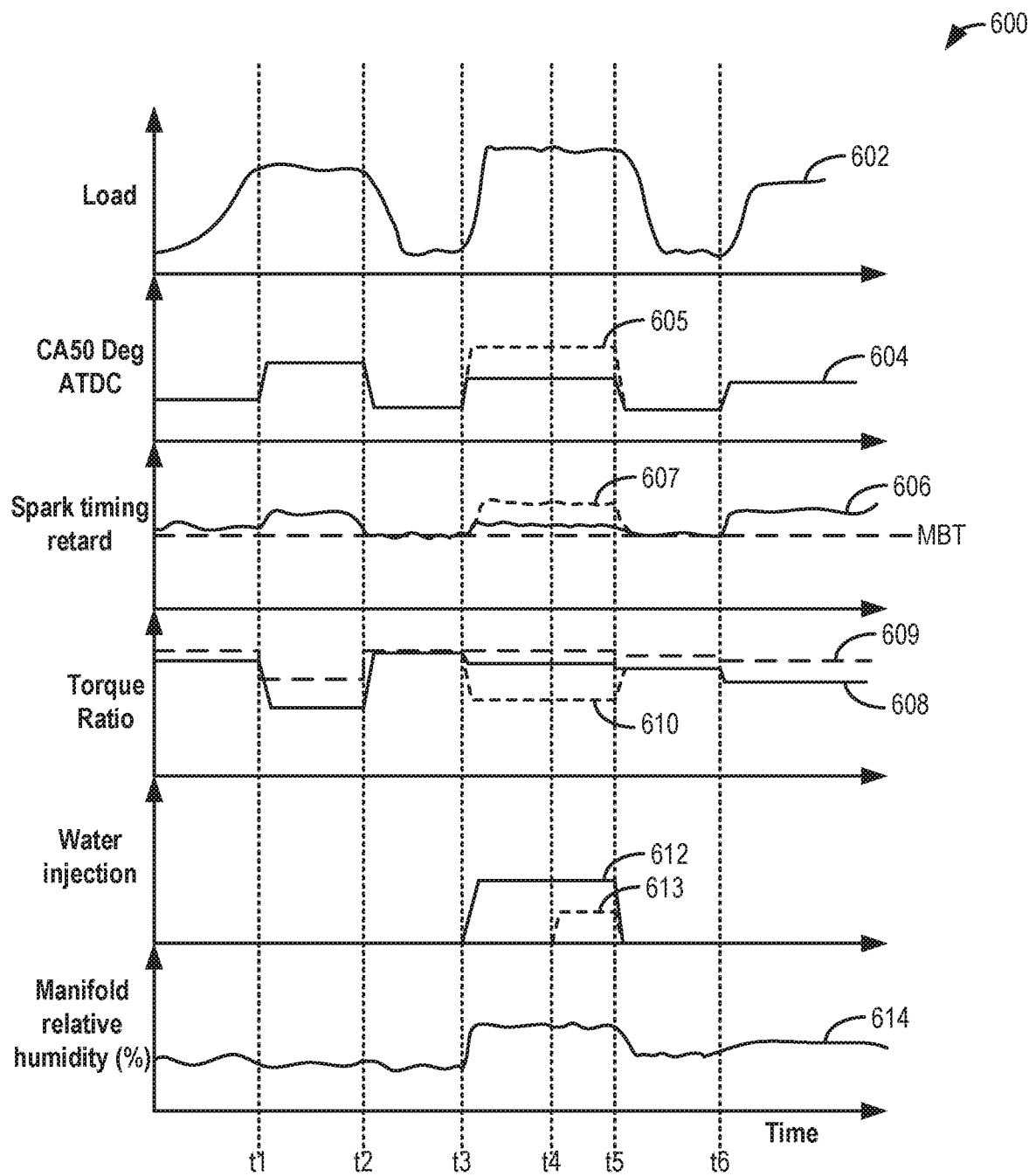
FIG. 6 shows an example use of water injection based on its effect on the torque ratio of the engine relative to BDL.

In FIG. 6, graph 600 illustrates example adjustments to water injection and engine operation based on the torque ratio of the engine at a given spark timing relative to torque ratio at borderline knock. For example, graph 600 illustrates adjustments to water injection from a manifold water injector or direct water injectors, and adjustments to an amount of spark timing retard that is applied as engine conditions change. Specifically, the operating parameters illustrated in graph 600 show changes in engine load at plot 602, changes in combustion phasing (depicted as a crank angle degree at which 50% of the combustion occurs, CA50) at plot 604, changes in spark timing retard relative to MBT at plot 606, changes in torque ratio at a given spark timing (plot 608) relative to torque ratio at BDL (plot 609), an amount of water injected via a manifold water injector at plot 612, an amount of water injected via direct water injectors at plot 613, and changes in manifold relative humidity at plot 614. For each operating parameter, time is depicted along the horizontal axis and values of each respective operating parameter are depicted along the vertical axis.

Prior to time t1, the engine is operating at relatively low speed and/or load conditions (plot 602). Additionally, the relative humidity is low (plot 614). At this time, no water injection is required. Also at this time, spark timing is set to be at or around MBT (e.g., only slightly retarded from MBT). For example, spark may be retarded such that CA50 is at 7CAD ATDC. Due to use of little to no spark retard, the engine is operated with a high current torque ratio (e.g., torque ratio=0.99), the torque ratio almost approaching the borderline torque ratio.

At time t1, there is an increase in engine speed/load due to an increase in torque demand. In one example, the increase in engine load is due to an operator pedal tip-in event. Due to the higher propensity for knock at the increased engine load, spark timing is retarded further from MBT. As a result, the current torque ratio (plot 608) decreases relative to torque ratio at BDL. Additionally, at time t1, the torque ratio at BDL (plot 609) decreases in response to changing engine operating conditions. For example, torque ratio at BDL may change responsive to conditions other than spark timing, such as due to changes in EGR flow, ambient conditions, etc. As an example, spark may be retarded such that CA50 is at 26CAD ATDC and the current torque ratio is at 0.8. Due to the relatively small difference at t1 between the current torque ratio (based on the spark timing at time t1) and the torque ratio at BDL, it may be inferred that water injection would provide a minimal fuel economy benefit. Consequently, the controller does not command water injection at t1 and instead relies only on spark retard for knock control.

At time t2, the engine load (plot 602) decreases due to a decrease in torque demand. Due to the decreased engine load, the controller decreases spark retard (that is, advances spark timing toward MBT (plot 606)). As a result, the torque ratio increases (plot 608) and CA50 decreases (plot 604). Also, the current torque ratio approaches the BDL torque ratio.

Next, at time t3, the engine load again increases due to an increase in torque demand, such as due to another operator tip-in event. Herein, the increase in engine load is to a higher engine load than the increase at t1. Based on the engine load, the adaptive spark timing amount required is shown at plot 607 (dashed line) with a resulting torque ratio shown at segment 610 (dashed line). In particular, a larger amount of spark retard from MBT would be required. For example, adaptive knock control may require spark to be retarded from MBT such that CA50 is at 30CAD ATDC causing the current torque ratio to move to 0.7. If the spark timing corresponding to plot 607 were applied, the current torque ratio would deviate from the BDL torque ratio by a larger amount. As used herein, the current torque ratio at the current spark timing includes the torque ratio before an adjusted amount of water is injected into the engine. Since the torque ratio at the current spark would be greater than a threshold distance from the torque ratio at BDL, the controller may infer that water injection at this engine load may provide a higher fuel economy benefit. Thus, at time t3, the controller operates with a torque ratio closer to the torque ratio at BDL by retarding spark timing and enabling manifold water injection (plot 612). Due to the water injection, spark timing can be advanced so that the amount of spark timing retard applied for knock control is reduced from the level shown at plot 607 to the level shown at plot 606. This causes the combustion phasing to advance from the timing shown at plot 605 (dashed) to the timing shown at plot 604.

As an example, manifold water injection may enable CA50 to be moved from 30CAD ATDC to 26 CAD ATDC with a corresponding change in the current torque ratio from 0.7 to 0.8 (and closer to a BDL torque ratio of 0.99, for example). In this way, water usage is adjusted based on the relative torque ratio to coordinate water usage with spark usage for knock control with improved fuel economy.

As a result of the manifold water injection, relative humidity at the manifold (plot 614) increases between t3 and t4. At time t4, the engine load remains high and water injection is still required to provide knock control. However, water injection from manifold injectors is at an upper limit (plot 612). In response to manifold injection at the upper limit, to provide further knock relief, the controller additionally injects water via direct injectors (plot 613) while maintaining the manifold water injection. In this way, water injection may still be used responsive to the relative torque ratio between the current torque ratio and the borderline torque ratio when manifold injection is at a saturation limit.

At time t5, the engine load decreases to a relatively low load due to a decrease in torque demand. Due to the decreased engine load, the controller decreases spark retard (that is, advances spark timing toward MBT (plot 606)) and disables water injection. As a result of the drop in spark retard usage, the torque ratio increases (plot 608) and CA50 decreases (plot 604). Also, the current torque ratio approaches the BDL torque ratio. Due to the disablement of manifold water injection, intake manifold humidity decreases. However, the relative humidity does not drop to levels before t3 due to an increase in the ambient humidity. In one example, ambient humidity may increase when the vehicle is in a new location with higher humidity than the previous location (at t3). In another example, ambient humidity may increase when weather conditions change, such as due to the presence of precipitation due to rain, fog, or snow. Due to the increased ambient humidity, BDL and torque ratio at BDL changes. At this time, the adaptive spark timing retard is small, and the current torque ratio is close to the BDL torque ratio, and so water injection remains disabled.

At time t6, the engine load increases due to another increase in torque demand. In one example, the relatively high engine load is due to an operator pedal tip-in event. Additionally, ambient humidity further increases. Due to a higher ambient humidity, BDL and therefore torque ratio at BDL changes again (plot 609). The controller increases spark retard to provide knock control at the higher load (plot 606). Due to the presence of higher relative humidity, the spark timing adjustment at time t6 moves the current torque ratio (plot 608) closer to the humidity adjusted BDL torque ratio (plot 609). Due to the smaller difference between the current and BDL torque ratio at this time, despite the higher engine load and higher knock propensity, water injection is not required even though water injection conditions are met due to the high engine load. In particular, due to the smaller difference, it may be determined that water injection may not provide sufficient combustion phasing advance and sufficient improvement in torque ratio. Therefore water is conserved for later use when water injection benefits are higher.

As elaborated above, at each engine operating point, an engine controller may determine a spark timing based on each of engine speed, load, and knock intensity, and compare a torque ratio at the determined spark timing to a torque ratio at borderline knock. The controller may then adjust an amount of water that is injected into the engine via a manifold water injector based on the comparing. The controller may further adjust the amount of water that is injected based on sensed intake manifold humidity. For example, the controller may determine whether to use spark control, water injection, or a combination thereof for knock relief. In addition, the controller may determine whether water usage is optimal or not at that time for knock relief. By advancing the spark timing based on the adjusted amount of water, the torque ratio of the engine can be increased and the engine can be operated at the more fuel economical and higher performance torque ratio.

In this way, water injection parameters are adjusted based on a torque ratio at a current spark timing (without water injection adjustments) relative to the torque ratio at borderline knock. By coordinating water injection with spark usage, water injection may be used during conditions when it will provide a higher benefit (per unit of water injected) for increased engine efficiency. The technical effect of enabling water injection when a difference between the current torque ratio and the torque ratio at borderline knock is greater than a threshold is that use of water injection is limited to times when the water injection has the highest impact, allowing water to be conserved. Additionally, by injecting water when a relatively large amount of spark retard would be required to reduce knock tendency, numerous changes in spark timing with changing engine load conditions may be reduced, thereby reducing bouncing of spark timing.

As one example embodiment, a method includes adjusting an amount of water injection into an engine responsive to a torque ratio at a current spark timing relative to torque ratio at borderline knock, and further based on sensed humidity in an engine intake manifold. In a first example of the method, the method further includes wherein the torque ratio at the current spark timing includes the torque ratio before the adjusted amount of water is injected into the engine. A second example of the method optionally includes the first example and further includes wherein the adjusting includes reducing the amount of water injected into the engine as the torque ratio at the current spark timing approaches a threshold, the threshold based on the torque ratio at borderline knock. A third example of the method optionally includes one or more of the first and second examples, and further includes wherein the adjusting further based on the sensed humidity includes increasing the amount of water injected into an intake manifold of the engine while the torque ratio at the current spark timing is below the threshold until the sensed humidity in the intake reaches a limit. A fourth example of the method optionally includes one or more of the first through third examples, and further comprises, after reaching the limit, direct injecting water into an engine cylinder until the torque ratio reaches the threshold, and then disabling water injection. A fifth example of the method optionally includes the first through fourth examples, and further includes wherein the adjusting includes reducing the amount of water injected into the engine responsive to the torque ratio at the current spark timing exceeding a threshold for longer than a duration, the threshold based on the torque ratio at borderline knock. A sixth example of the method optionally includes the first through fifth examples, and further includes wherein the adjusting includes reducing the amount of water injected into the engine as the torque ratio at the current spark timing approaches the torque ratio at borderline knock. A seventh example of the method optionally includes the first through sixth examples, and further comprises, adjusting the spark timing based on each of a current engine speed and a current engine load, and further based on feedback from an engine knock sensor. An eighth example of the method optionally includes the first through seventh examples, and further comprises, selectively deactivating one or more engine cylinders responsive to the current engine load being lower than a threshold, and adjusting a duration of operating with the one or more cylinders deactivated based on a torque ratio with the adjusted amount of water injected relative to torque ratio at borderline knock. A ninth example of the method optionally includes the first through eighth examples, and further comprises wherein the adjusting includes: extending engine operation with the one or more cylinders deactivated when a difference between the torque ratio with the adjusted amount of water and the torque ratio at borderline knock exceeds a threshold difference; and reactivating the one or more deactivated cylinders while disabling water injection when difference between the torque ratio with the adjusted amount of water and the torque ratio at borderline knock is less than the threshold difference. A tenth example of the method optionally includes the first through ninth examples, and further comprises, advancing spark timing from the current spark timing while injecting the adjusted amount of water.

As another example embodiment, a method comprises responsive to a change in engine load, selecting between operating an engine with one or more cylinders deactivated while water is injected into an intake manifold, and operating the engine with all cylinders active and water injection disabled based on a torque ratio at a current spark timing relative to torque ratio at borderline knock. In a first example of the method, the method further includes wherein the selecting is further based on sensed humidity in the intake manifold, the humidity sensed via an intake manifold sensor. A second example of the method optionally includes the first example and further includes wherein operating the engine with one or more cylinders deactivated includes operating with a first spark timing, and operating the engine with all cylinders active includes operating with a second, different spark timing, and wherein selecting based on the torque ratio includes selecting based on a comparison of each of the torque ratio at the first spark timing and the torque ratio at the second spark timing to the torque ratio at borderline knock. A third example of the method optionally includes one or more of the first and second examples, and further includes wherein the second spark timing is more retarded than the first spark timing. A fourth example of the method optionally includes the first through third examples, and further includes wherein the selecting includes: operating the engine with the one or more cylinders deactivated and water injected into the intake manifold when a first difference between the torque ratio at the first spark timing and the torque ratio at borderline knock is larger than a second difference between the torque ratio at the second spark timing and the torque ratio at borderline knock; and operating the engine with all cylinders active and water injection disabled when the second difference is larger than the first difference. A fifth example of the method optionally includes one or more of the first through fourth examples, and further comprises: while operating the engine with the one or more cylinders deactivated and water injection enabled, responsive to the torque ratio at the first spark timing being higher than a threshold for a duration, reactivating the cylinders and disabling the water injection, the threshold based on the torque ratio at borderline knock. A sixth example of the method optionally includes one or more of the first through fifth examples, and further includes wherein the selecting further based on sensed humidity includes injecting water into the intake manifold until the sensed humidity is at a threshold humidity, and then disabling water injection and reactivating the one or more deactivated cylinders even if the first difference is larger than the second difference.

As yet another example embodiment, a method comprises at each engine operating point, determining a spark timing based on each of engine speed, load, and knock intensity; comparing a torque ratio at the determined spark timing to a torque ratio at borderline knock; and adjusting an amount of water injected into the engine via a manifold water injector based on the comparing. In a first example of the method, the method further includes wherein the amount of water injected is further adjusted based on sensed intake manifold humidity, the method further comprising advancing the spark timing based on the adjusted amount of water.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
at each engine operating point,
determining a spark timing based on each of engine speed, load, and knock intensity;
comparing a torque ratio at the determined spark timing to a torque ratio at borderline knock; and
adjusting an amount of water injected into an engine via a manifold water injector based on the comparing.

2. The method of claim 1, wherein the amount of water injected is further adjusted based on sensed intake manifold humidity, the method further comprising advancing the spark timing based on the adjusted amount of water.

3. The method of claim 1, wherein the torque ratio at the current spark timing includes the torque ratio before the adjusted amount of water is injected into the engine.

4. The method of claim 1, wherein the adjusting includes reducing the amount of water injected into the engine as the torque ratio at the current spark timing approaches a threshold, the threshold based on the torque ratio at borderline knock.

5. The method of claim 4, further including disabling water injection and adjusting spark at a threshold.

6. The method of claim 1, wherein the adjusting further based on the sensed humidity includes increasing the amount of water injected into an intake manifold of the engine while the torque ratio at the current spark timing is below the threshold until the sensed humidity in the intake manifold reaches a limit.

7. The method of claim 1, further comprising direct injecting water into an engine cylinder until the torque ratio at the current spark timing reaches the threshold, and then disabling water injection.

8. The method of claim 1, wherein the adjusting includes reducing the amount of water injected into the engine responsive to the torque ratio at the current spark timing exceeding a threshold for longer than a duration, the threshold based on the torque ratio at borderline knock.

9. The method of claim 1, wherein the adjusting includes reducing the amount of water injected into the engine as the torque ratio at the current spark timing approaches the torque ratio at borderline knock.

10. The method of claim 1, further comprising, determining the current spark timing further based on feedback from an engine knock sensor.

11. The method of claim 1, further comprising adjusting an amount of water injected and sparking timing based on a determination if a variable displacement mode is active.

12. The method of claim 11, further comprising comparing fuel economy in an active and inactive variable displacement mode.

13. The method of claim 1, further comprising, advancing spark timing from the current spark timing while injecting the adjusted amount of water.

14. The method of claim 1, wherein selecting based on the torque ratio includes selecting based on a comparison of each of the torque ratio at the first spark timing and the torque ratio at the second spark timing to the torque ratio at borderline knock.

15. The method of claim 1, further comprising vary an amount of water injected while also adjusting a timing of the water injection and a number of injection pulses.

16. The method of claim 1, further comprising injecting a first amount of water and adjusting an amount of a subsequent injection based on a torque ratio in response the first amount.

17. The method of claim 1, further comprising comparing an amount of water to be injected to an amount of water available.

18. The method of claim 1, further comprising reducing the amount of spark retardation based on an amount of water injected.

19. The method of claim 1, wherein water is injected into an intake manifold, a cylinder or both.

20. The method of claim 1, wherein a variable displacement mode duration is increased in response to a water injection.

\* \* \* \* \*